United States Patent
Shin et al.

(10) Patent No.: US 8,675,358 B2
(45) Date of Patent: Mar. 18, 2014

(54) PORTABLE TERMINAL AND METHOD FOR MANUFACTURING THE SAME

(75) Inventors: Dongsik Shin, Incheon (KR); Wonseok Joo, Seoul (KR); Jaeeon Lee, Suwon (KR)

(73) Assignee: LG Electronics Inc., Seoul (KR)

( * ) Notice: Subject to any disclaimer, the term of this patent is extended or adjusted under 35 U.S.C. 154(b) by 326 days.

(21) Appl. No.: 13/161,654

(22) Filed: Jun. 16, 2011

(65) Prior Publication Data
US 2012/0120570 A1 May 17, 2012

(30) Foreign Application Priority Data
Nov. 16, 2010 (KR) .................... 10-2010-0114052

(51) Int. Cl.
*G06F 1/16* (2006.01)

(52) U.S. Cl.
USPC .............. 361/679.55; 361/679.3; 361/679.56; 455/575.1; 379/433.13

(58) Field of Classification Search
None
See application file for complete search history.

(56) References Cited

U.S. PATENT DOCUMENTS

| | | | | |
|---|---|---|---|---|
| 5,433,056 A * | 7/1995 | Benson et al. | ............... | 52/794.1 |
| 7,027,036 B2 * | 4/2006 | Yang | ............................. | 345/170 |
| 7,437,184 B2 * | 10/2008 | Faust | .......................... | 455/575.1 |
| 7,609,513 B2 * | 10/2009 | Chang | ....................... | 361/679.46 |
| 7,903,422 B2 * | 3/2011 | Watanabe | ..................... | 361/719 |
| 8,021,729 B2 * | 9/2011 | Chiang | ......................... | 428/35.8 |
| 8,153,270 B2 * | 4/2012 | Akieda et al. | .............. | 428/542.2 |
| 8,273,986 B2 * | 9/2012 | Liu et al. | .......................... | 174/60 |
| 8,280,458 B2 * | 10/2012 | Joo | ............................. | 455/575.1 |
| 8,364,212 B2 * | 1/2013 | Waku et al. | ................. | 455/575.1 |
| 2004/0090737 A1 | 5/2004 | Shimura et al. | | |
| 2005/0032558 A1 * | 2/2005 | Chen | ........................... | 455/575.1 |
| 2005/0279617 A1 * | 12/2005 | Han | .............................. | 200/310 |
| 2009/0111534 A1 * | 4/2009 | Lu et al. | ..................... | 455/575.1 |
| 2010/0014232 A1 * | 1/2010 | Nishimura | ................. | 361/679.3 |
| 2012/0097412 A1 * | 4/2012 | Wennemer et al. | ............. | 174/50 |

FOREIGN PATENT DOCUMENTS

| | | |
|---|---|---|
| CN | 101195320 A | 6/2008 |
| CN | 101497251 A | 8/2009 |

* cited by examiner

*Primary Examiner* — Anthony Q Edwards
(74) *Attorney, Agent, or Firm* — Birch, Stewart, Kolasch & Birch, LLP (57) ABSTRACT

A portable terminal includes a first metallic layer formed of a metallic material and having a through hole on one surface thereof, a second metallic layer laminated on another surface of the first metallic layer and formed of a different material from the first metallic layer, and an exposed portion protruding from one surface of the second metallic layer and arranged at the through hole so as to be exposed to outside of the first metallic layer via the through hole. Under this configuration, a unique pattern may be implemented on the appearance. This may implement a personalized design and a sophisticated appearance.

13 Claims, 8 Drawing Sheets

PORTABLE TERMINAL AND METHOD FOR MANUFACTURING THE SAME

CROSS-REFERENCE TO RELATED APPLICATIONS

Pursuant to 35 U.S.C. §119(a), this application claims the benefit of earlier filing date and right of priority to Korean Application No. 10-2010-0114052, filed on Nov. 16, 2010 the contents of which is incorporated by reference herein in its entirety.

BACKGROUND OF THE DISCLOSURE

1. Field of the Disclosure

This specification relates to a portable terminal and a method for fabricating the same, and more particularly, to a portable terminal having a pattern on a cover and a method for fabricating the same.

2. Description of the Related Art

Recently, as functions of a portable terminal become more diversified, the portable terminal can support more complicated functions such as capturing images or video, reproducing music or video files, playing games, receiving broadcast signals, and the like. By comprehensively and collectively implementing such functions, the portable terminal may be embodied in the form of a multimedia player or a device.

The portable terminal may be classified into a mobile (portable) terminal and a stationary terminal according to a moveable state. The portable terminal is a device that can be carried around and has one or more functions such as to perform voice and video call communications, inputting and outputting information, storing data, and the like.

Various attempts have been made to implement complicated functions in such a multimedia device by means of hardware or software.

When fabricating the portable terminal, may be considered various factors which influence on the appearance of a case, a key mark, etc. in order to enhance the entire appearance.

SUMMARY OF THE DISCLOSURE

Therefore, an aspect of the detailed description is to provide a portable terminal having an appearance differentiated from the conventional one, especially, to provide a portable terminal having a unique pattern on an external surface of a case.

To achieve these and other advantages and in accordance with the purpose of this specification, as embodied and broadly described herein, there is provided a portable terminal including a first metallic layer formed of a metallic material and having a through hole on one surface thereof, a second metallic layer laminated on another surface of the first metallic layer and formed of a different material from the first metallic layer, and an exposed portion protruding from one surface of the second metallic layer and arranged at the through hole so as to be exposed to outside of the first metallic layer via the through hole.

The exposed portion may be formed by being recessed from another surface of the second metallic layer towards the through hole.

The exposed portion may be provided with an oxidation coating layer or a plating layer on one surface thereof exposed via the through hole.

The exposed portion may be formed as one surface of the second metallic layer is extending by a pressure applied to the second metallic layer.

According to another aspect of the present disclosure, there is provided a portable terminal including a terminal body, an antenna mounted in the terminal body and configured to radiate a radio signal, and a cover attached to the terminal body, wherein the cover includes a first metallic layer formed of a metallic material and having a through hole on one surface thereof, a second metallic layer laminated on another surface of the first metallic layer and formed of a different material from the first metallic layer, and an exposed portion protruding from one surface of the second metallic layer and arranged at the through hole so as to be exposed to outside of the first metallic layer via the through hole.

The exposed portion may be formed by being recessed from another surface of the second metallic layer towards the through hole.

The exposed portion may be provided with an oxidation coating layer or a plating layer on one surface thereof exposed via the through hole.

The first metallic layer or the second metallic layer may include a plurality of hook portions so as to be coupled to the terminal body.

The exposed portion may be protruding from one surface of the first metallic layer towards outside by a predetermined gap.

Another surface of the second metallic layer may be coupled to a key body, so that the cover and the key body constitute keys as a unit.

A key mark may be formed on an upper surface of the exposed portion in a predetermined pattern.

The portable terminal according to the present disclosure may further include an optical source configured to provide light emission through a gap between an insertion hole and the cover.

The cover may be arranged so as to overlap the antenna, and the second metallic layer may be formed of stainless steel or titanium in order to reduce lowering of a radiation efficiency of the antenna.

The metallic layers may be formed of at least one of titanium (Ti) and stainless steel (STS) in order to be coupled to each other by welding.

The metallic layers may be formed of at least one of aluminum (Al), magnesium (Mg) and copper (Cu) so that a molding layer can be formed by anodizing or by plating.

The portable terminal according to the present disclosure may further include a camera mounted in the terminal body, and configured to capture an image.

The exposed portion may include a second through hole so that the camera having a lens may be arranged.

The second metallic layer may be formed of at least one of aluminum (Al), magnesium (Mg) and copper (Cu), and an anodized molding layer may be laminated on one surface of the exposed portion.

To achieve these and other advantages and in accordance with the purpose of this specification, as embodied and broadly described herein, there is also provided a method for fabricating a portable terminal laminating, on a first metallic layer, a second metallic layer formed of a different material from the first metallic layer, press-processing the laminated metallic layers thereby forming a pattern protruding from one surface of the first metallic layer, exposing the second metallic layer from the protruding pattern, and forming an oxidation coating layer or a plating layer on the exposed second metallic layer.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE DISCLOSURE

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a portable terminal according to the present disclosure will be explained in more detail with reference to the attached drawings The suffixes attached to components of the portable terminal, such as 'module' and 'unit or portion' were used for facilitation of the detailed description of the present disclosure. Therefore, the suffixes do not have different meanings from each other. The same reference numerals will be given to the same components as those of the aforementioned embodiment, and their explanations will be omitted. The singular expression of the present disclosure may include a plural concept unless distinctively differently defined.

The portable terminal according to the present disclosure may include a portable phone, a smart phone, a laptop computer, a digital broadcasting terminal, Personal Digital Assistants (PDA), Portable Multimedia Player (PMP), a navigation system, etc., and a fixed terminal such as a digital TV, a desktop computer, etc.

Figure 1:
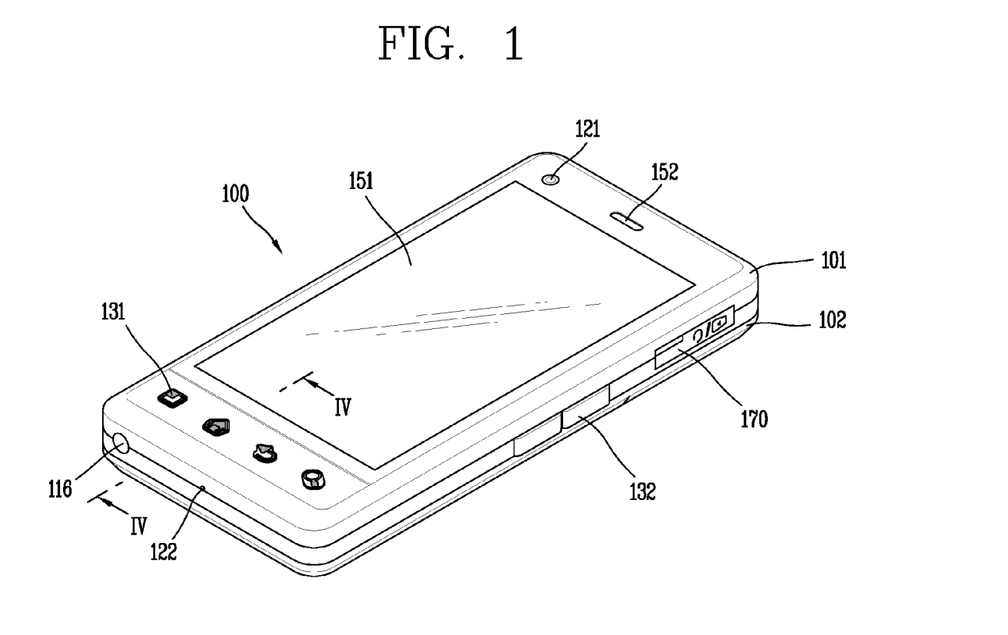
FIG. 1 is a front perspective view of a portable terminal according to one embodiment of the present disclosure.

FIG. 1 is a front perspective view of a portable terminal according to one embodiment of the present disclosure.

The portable terminal 100 may be a bar-type portable terminal consisting of one body. However, the present disclosure is not limited to this. That is, the present disclosure may be applicable to various structures such as a slide type where at least two bodies are coupled to each other so as to perform a relative motion, a folder type, a swing type, a swivel type, etc.

A case (casing, housing, cover, etc.) forming an outer appearance of a body may include a front case 101 and a rear case 102. A space formed by the front case 101 and the rear case 102 may accommodate various components therein. At least one intermediate case may further be disposed between the front case 101 and the rear case 102.

Such cases may be formed by injection-molded synthetic resin, or may be formed using a metallic material such as stainless steel (STS) or titanium (Ti).

At the front case 101, may be disposed a display unit 151, an audio output unit 152, a camera 121, user input units 130, 131 and 132, a microphone 122, an interface unit 170, etc.

The display unit 151 occupies most parts of a main surface of the front case 101. The audio output unit 152 and the camera 121 are arranged at a region adjacent to one end of the display unit 151, and the user input unit 131 and the microphone 122 are arranged at a region adjacent to another end of the display unit 151. The user input unit 132, the interface unit 170, etc. may be arranged on side surfaces of the rear case 102.

The user input unit 130 is manipulated to receive a command for controlling the operation of the portable terminal 100, and may include a plurality of manipulation units 131 and 132. The manipulation units 131 and 132 may be referred to as manipulating portions, and may include any type of ones that can be manipulated in a user's tactile manner.

Commands inputted through the first or second user input units 131 and 132 may be variously set. For instance, the first manipulation unit 131 is configured to input commands such as START, END, SCROLL or the like, and the second manipulation unit 132 is configured to input commands for controlling a level of sound outputted from the audio output unit 152, or commands for converting the current mode of the display unit 151 to a touch recognition mode.

Figure 2:
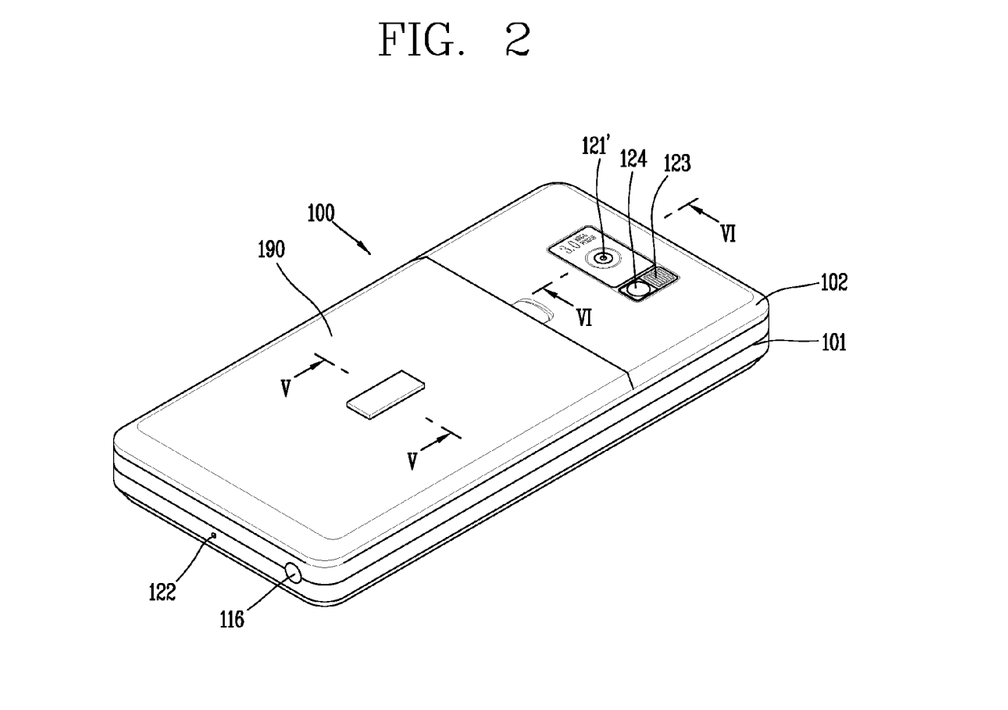
FIG. 2 is a rear perspective view of the portable terminal of FIG. 1.

FIG. 2 is a rear perspective view of the portable terminal 100 of FIG. 1.

Referring to FIG. 2, a camera 121' may be additionally provided on the rear case 102. The camera 121' faces a direction which is opposite to a direction faced by the camera 121, and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use. The cameras 121 and 121' may be installed at a terminal body so as to rotate or pop-up.

A flash 123 and a mirror 124 may be additionally disposed adjacent to the camera 121'. The flash 123 operates in conjunction with the camera 121' when taking a picture using the camera 121'. The mirror 124 can cooperate with the camera 121' to allow a user to photograph himself or herself in a self-portrait mode.

An audio output unit may be additionally arranged on a rear surface of the terminal body. The audio output unit may cooperate with the audio output unit 152 (refer to FIG. 1) disposed on a front surface of the terminal body so as to implement a stereo function. Also, the audio output unit may be configured to operate as a speakerphone.

A broadcast signal receiving antenna 116 as well as an antenna for calling may be disposed on a side surface of the terminal body. The broadcast signal receiving antenna 116 which constitutes a part of a broadcasting receiving module may be configured to retract into the terminal body.

Figure 3:
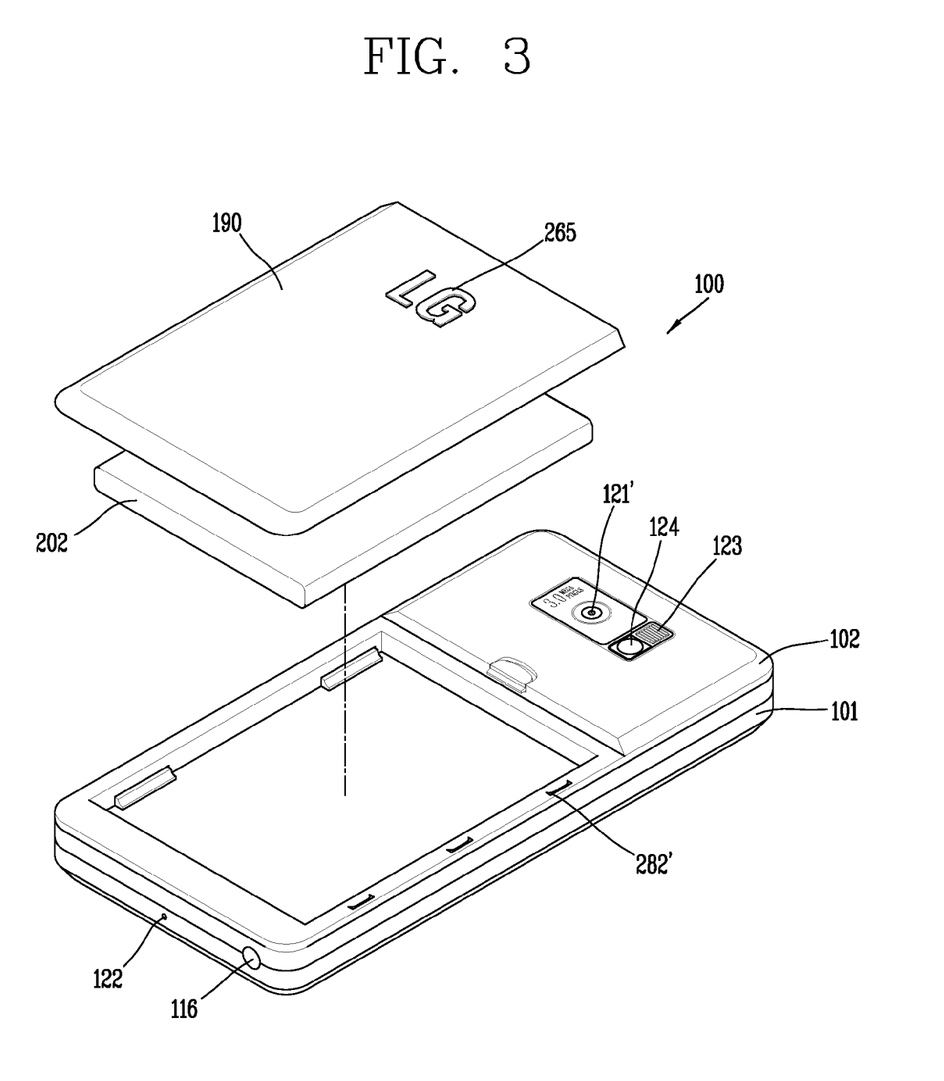
FIG. 3 is an exploded perspective view of the portable terminal of FIG. 2.
Figure 4A:
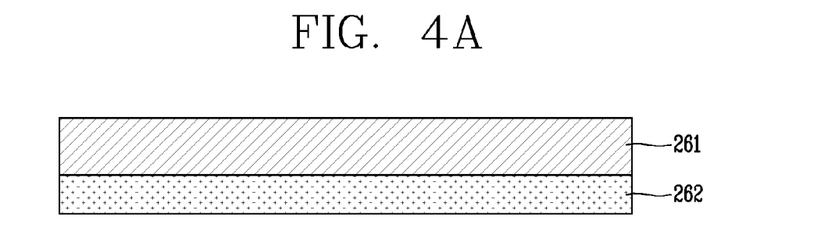
FIG. 4A~4D are conceptual views showing a method for fabricating a cover of a portable terminal according to one embodiment of the present disclosure.
Figure 4B:
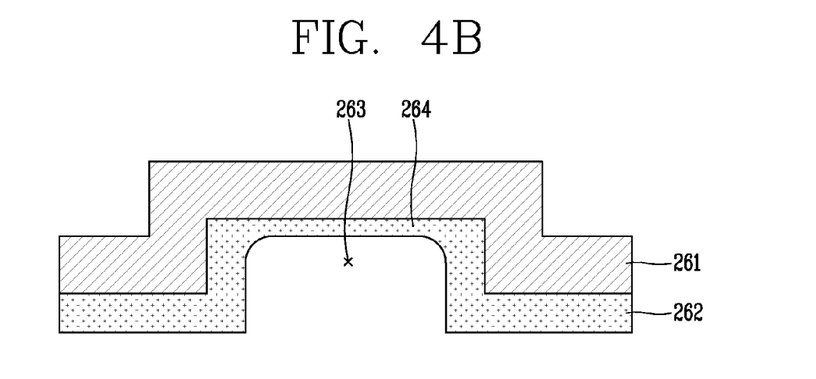
Figure 4C:
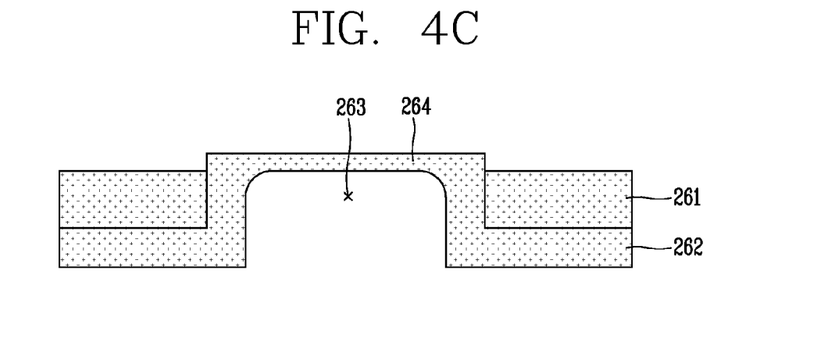
Figure 4D:
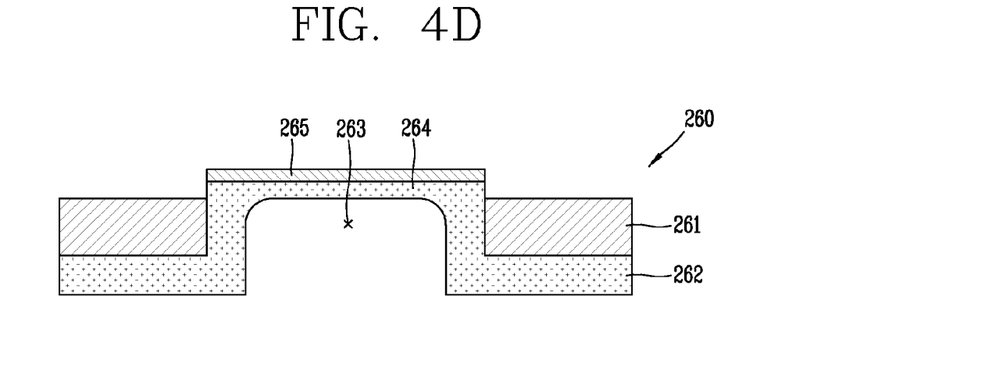

A power supply unit for supplying power to the portable terminal 100 is mounted to the terminal body. The power supply unit may be mounted in the terminal body, or may be configured to be detachable from the outside of the terminal body. As shown in FIG. 3, the power supply unit may be mounted in a battery cover 190, and may be implemented as a battery 202 mounted in the portable terminal 100 and configured to supply electricity to one or more components. The battery 202 may be exposed to the outside in a state of being disposed at an inner space of the battery cover 190.

A touch pad for detecting touch may be additionally mounted to the rear case 102. The touch pad may be also configured to be transmissive like the display unit 151. When the display unit 151 is configured to output visual information from two surfaces, the visual information may be recognized even through the touch pad. The visual information output from the two surfaces of the display unit 151 may be controlled by the touch pad. A display may be additionally mounted to the touch pad, and a touch screen may be arranged at the rear case 102.

The touch pad interworks with the display unit 151 of the front case 101. The touch pad may be arranged at a rear side of the display unit 151 in parallel. This touch pad 135 may have a size equal to or smaller than that of the display unit 151.

Hereinafter, a cover 260 of a portable terminal 100 according to the present disclosure will be explained in more details with reference to the attached drawings.

FIG. 4 is a conceptual view showing a method for fabricating a cover 260 of a portable terminal 100 according to one embodiment of the present disclosure. As shown, the cover 260 of the portable terminal 100 includes a first metallic layer 261, and a second metallic layer 262 formed of a different material from the first metallic layer 261.

The second metallic layer 262 may be laminated on the first metallic layer 261, or the first metallic layer 261 may be laminated on the second metallic layer 262. This lamination method is similar to a method for fabricating a clad sheet. This lamination method of hetero metallic materials may include one of a diffusion bonding, an explosion welding or a hot rolling. For instance, the first metallic layer 261 formed of stainless steel and the second metallic layer 262 formed of aluminum are laminated on each other by a hot rolling. Firstly, scales on the surfaces of the first and second metallic layers are removed, and the first and second metallic layers are washed. Then, concave-convexed portions are formed on the washed surfaces of the first and second metallic layers by using a metallic brush. Then, the stainless steel having the concave-convexed portions on the surface thereof is heated at a temperature of 600~800° C., and the aluminum is heated at a temperature of 350~450° C. Then, the heated two sheets are overlapped with each other to be laminated on each other by rolling with a reduction ratio of 20~50% and with a speed less than 10 m/second.

The laminated first and second metallic layers 261 and 262 undergo a press-processing, thereby forming a pattern protruding from one surface of the first metallic layer 261. Then, the first metallic layer 261 which exists on an upper surface of the protruding pattern is removed through a numerical control processing, a laser processing, etc. In this case, only a part of the first metallic layer 261 may be removed for implementation of a specific pattern. Alternatively, the first metallic layer 261 may be removed and the second metallic layer 262 may be exposed to the outside by using the conventional metallic processing technology rather than the above processing technology. Then, the exposed second metallic layer 262 is anodized to implement a specific color or logo. Rather than the anodizing method, the portable terminal 100 may implement a case having a unique personalized pattern. More concretely, the second metallic layer 262 may be exposed to one surface of the first metallic layer 261, and the exposed second metallic layer 262 may be plated.

Figure 5:
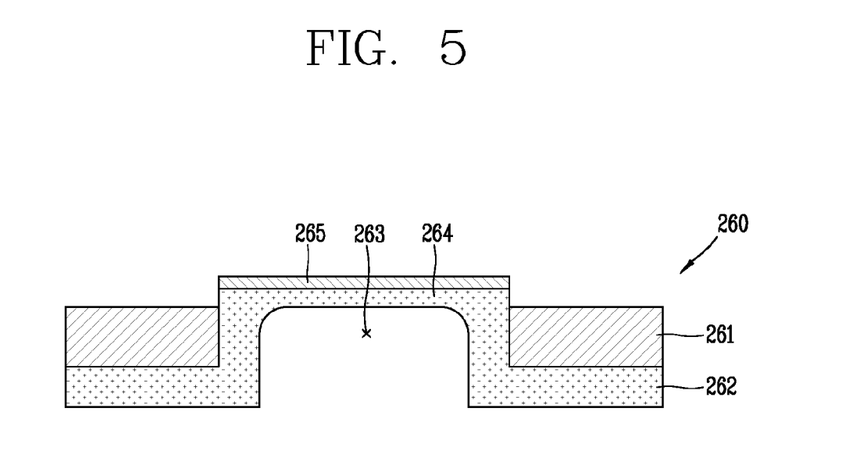
FIG. 5 is a sectional view taken along line 'V-V' in FIG. 2.
Figure 6:
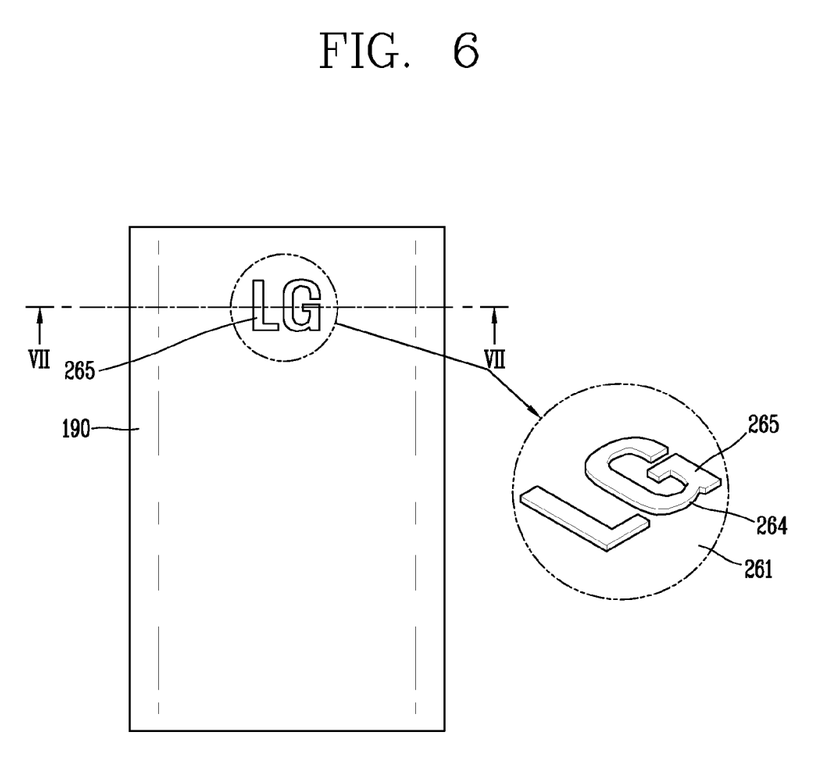
FIG. 6 is a conceptual view showing a front surface of a battery cover according to one embodiment of the present disclosure.
Figure 7:
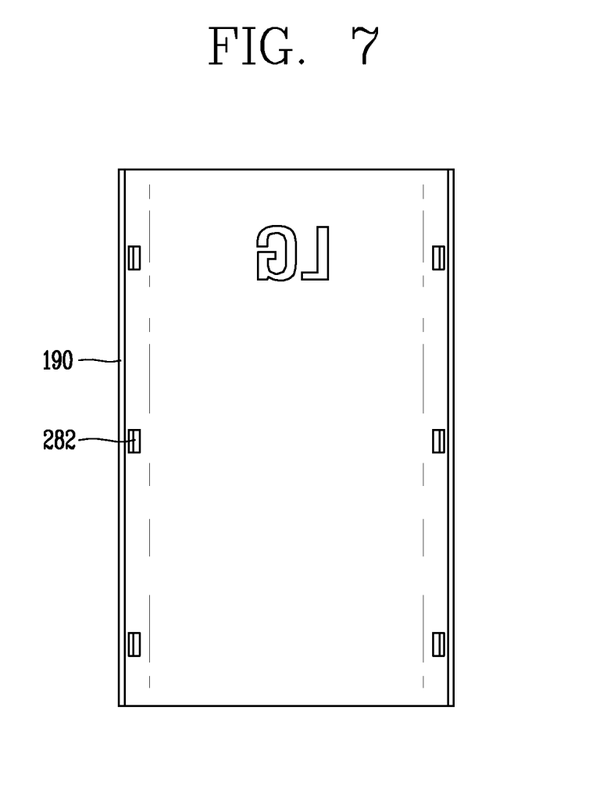
FIG. 7 is a rear view of FIG. 6.
Figure 8:
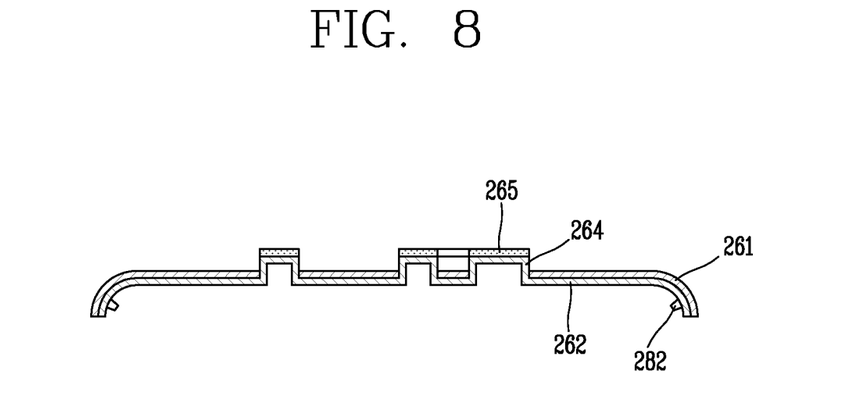
FIG. 8 is a sectional view taken along line 'VII-VII' in FIG. 6.

FIG. 5 is a sectional view taken along line 'V-V' in FIG. 2, FIG. 6 is a conceptual view showing a front surface of a battery cover according to one embodiment of the present disclosure, FIG. 7 is a rear view of FIG. 6, and FIG. 8 is a sectional view taken along line 'VII-VII' in FIG. 6. The cover 260 according to one embodiment of the present disclosure may be applied to parts where the battery cover 190, the key 131 or the cameras 121, 121' are arranged. The cover 260 may be also applied to any part of a case which constitutes the appearance of the portable terminal 100.

As shown in FIG. 5, the cover 260 of the portable terminal 100 according to one embodiment of the present disclosure includes a metallic layer 261, a second metallic layer 262, and an exposed portion 264. As aforementioned, the second metallic layer 262 may be laminated on the first metallic layer 261, or the first metallic layer 261 may be laminated on the second metallic layer 262. The reason why hetero metallic layers are laminated on each other is in order to implement a sophisticated appearance of the portable terminal by forming a unique pattern on the case which constitutes the appearance of the portable terminal 100. Accordingly, the present disclosure may provide a case having no restrictions in a material or a shape. When the cover of the portable terminal is formed of stainless steel (STS) or titanium (Ti), it is generally easy to perform a welding processing with respect to hooks coupled to the terminal body, or a press-processing for forming a predetermined pattern. However, in this case, it is difficult to implement various colors or designs. On the contrary, when the cover of the portable terminal is formed of aluminum, copper or magnesium alloy, it is possible to implement a sophisticated color or design through anodizing. However, it is difficult to perform a welding process with respect to hooks, and an intensity of the case is lowered. The present disclosure provides a cover of a portable terminal having no restrictions.

When a specific pattern is formed through anodizing by forming the first metallic layer 261 with using aluminum, etc., the second metallic layer 262 may be formed of titanium or stainless steel. This may strengthen an intensity of the cover, and may weld hook portions 282 to the second metallic layer 262. On the contrary, when the first metallic layer 261 is formed with using titanium or stainless steel through a press-processing and a numerical control processing, the second metallic layer 262 formed of aluminum, etc. may be exposed to the outside. And, the exposed surface undergoes an anodizing process to form a molding layer 265, thereby implementing a specific pattern or logo. In this case, as shown in FIG. 8, one end of the second metallic layer 262, an end portion of a side surface of the battery cover coupled to the terminal body is removed. Then, the hook portions 282 are formed on the first metallic layer by welding. As shown in FIG. 3, the battery cover may be detachably coupled to a locking portion 282'.

As aforementioned, the exposed portion 264 is formed by removing the first metallic layer 261 laminated on the protruding pattern. The first metallic layer 261 and the second metallic layer 262 are protruding by a press-processing, and a through hole 263 is formed at the first metallic layer 261 by removing the first metallic layer 261. The exposed portion 264 is formed as a part of the second metallic layer 262 is extending via the through hole 263 by receiving a pressure due to a press-processing.

Figure 9:
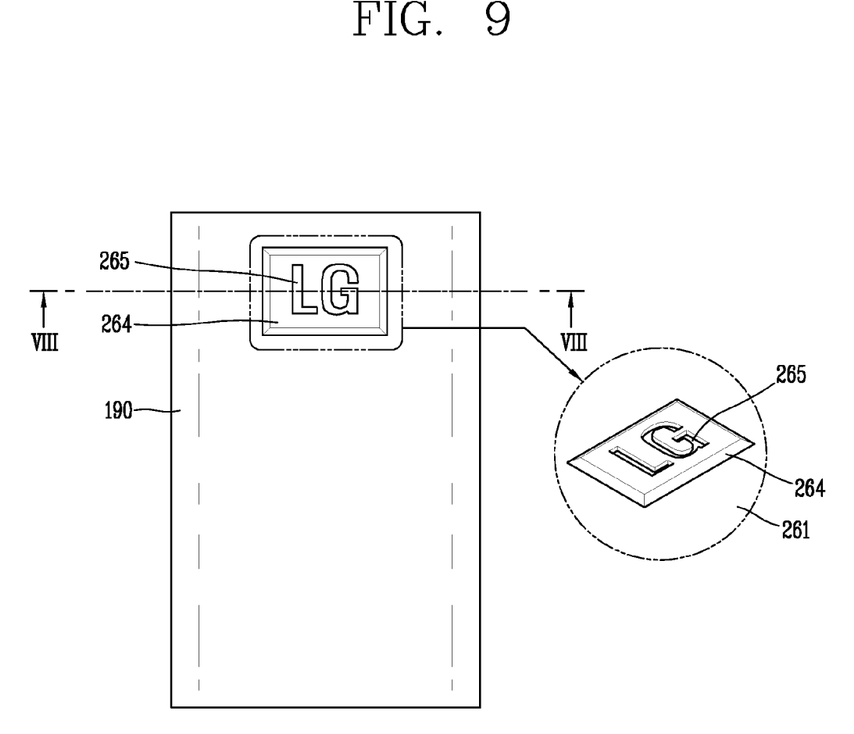
FIG. 9 is a conceptual view showing a front surface of a battery cover according to another embodiment of the present disclosure.
Figure 10:
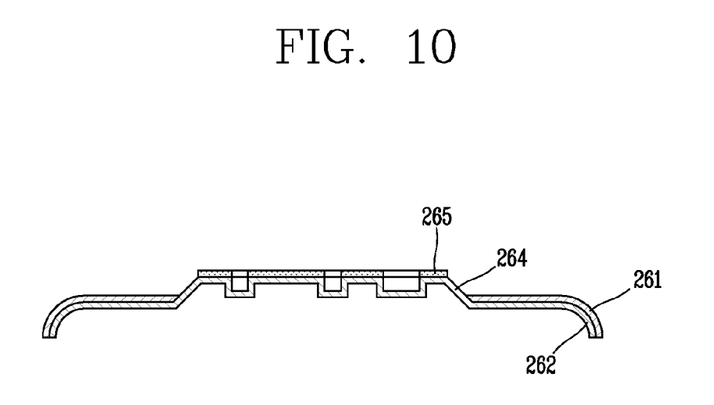
FIG. 10 is a sectional view taken along line 'VIII-VIII' in FIG. 9.

FIG. 9 is a conceptual view showing a front surface of a battery cover according to another embodiment of the present disclosure, and FIG. 10 is a sectional view taken along line 'VIII-VIII' in FIG. 9. As shown, one surface of the battery cover is protruding by being pressed, and then the first metallic layer is removed to form the exposed portion. Then, the molding layer corresponding to a logo may be formed by etching. In case of arranging the cover 260 according to one embodiment of the present disclosure so as to overlap an antenna of the portable terminal 100, the second metallic layer 262 is formed of stainless steel or titanium. This may reduce lowering of a radiation efficiency of the antenna. Here, arranging the cover 260 so as to overlap an antenna of the portable terminal 100 indicates covering a space where the antenna is accommodated with using the battery cover 190.

Figure 11:
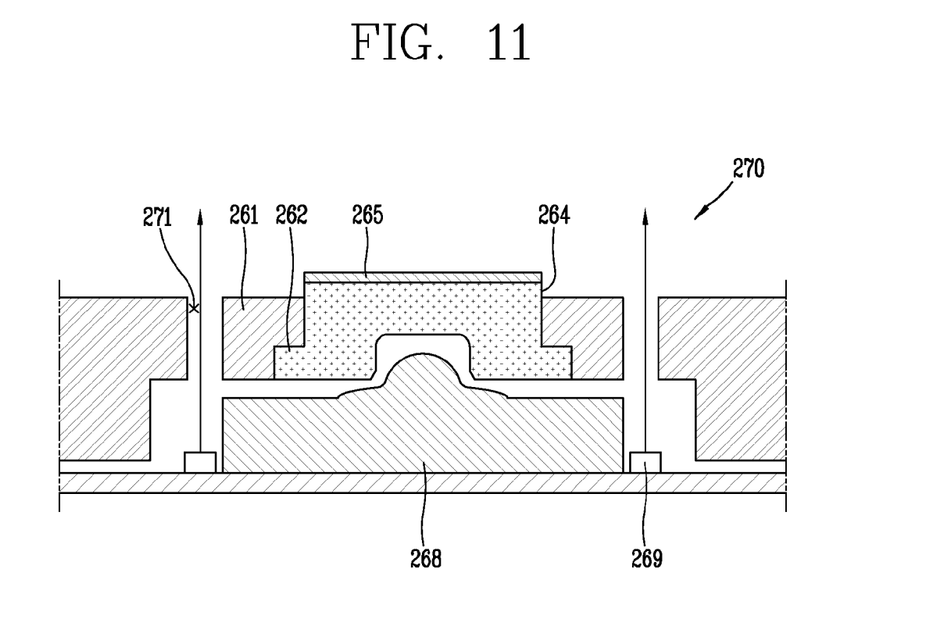
FIG. 11 is a sectional view taken along line 'IV-IV' in FIG. 2.
Figure 12:
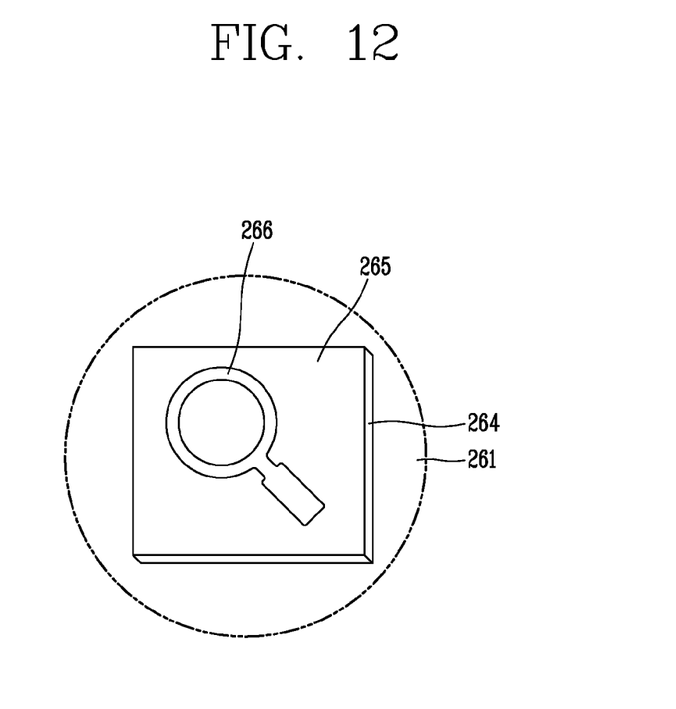
FIG. 12 is a planar view of FIG. 11.

FIG. 11 is a sectional view taken along line 'IV-IV' in FIG. 2, and FIG. 12 is a planar view of FIG. 11.

As shown in FIG. 11, the cover 260 according to one embodiment of the present disclosure may implement keys together with a key body 268. This key is provided with hetero metallic layers to implement a unique appearance. The key is inserted into an insertion hole 271 formed at the terminal body so that at least one surface thereof can be exposed to the outside. The cover 260 may be attached to the key body 268, and the exposed portion 264 of the cover 260 may be protruding from the first metallic layer 261 by a predetermined gap. An optical source 269 such as an LED may be formed around the key. Under this configuration, light from the optical source 269 is leaked to a minute gap between the key and the case of the portable terminal, thereby enhancing a user's manipulation and providing sophisticated feeling of the portable terminal. As shown in FIG. 12, a key mark 266 relating to functions of the portable terminal may be formed at the cover 260 in a predetermined pattern.

Figure 13:
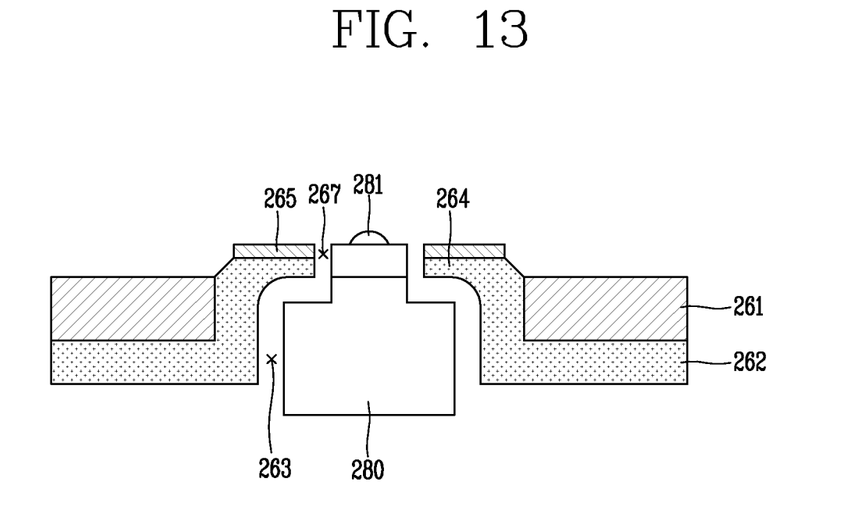
FIG. 13 is a sectional view taken along line 'VI-VI' in FIG. 2.

FIG. 13 is a sectional view taken along line 'VI-VI' in FIG. 2.

As shown, the cover 260 according to one embodiment of the present disclosure may be used as a part of a camera housing at a position where the camera 280 of the portable terminal 100 is arranged, so as to prevent lowering of a function of the camera 280 due to reflection of light, diffraction, etc. on a camera lens 281. That is, a color of the exposed portion 264 is anodized so as to reduce reflection or light. For this, the exposed portion 264 is formed to include a second through hole 267, and a lens is arranged at the second through hole 267.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal comprising:
   a terminal body, the terminal body having an insertion hole formed therein;
   a cover attached to the terminal body, the cover defining an exterior of the portable terminal, the cover being located in the insertion hole, the cover including:
      a first metallic layer formed of a metallic material, the first metallic layer having a through hole;
      a second metallic layer provided on a surface of the first metallic layer, the second metallic layer formed of a different material from that of the first metallic layer; and
      an exposed portion protruding from a surface of the second metallic layer and extending through the through hole so as to be exposed to an outside of the first metallic layer, the exposed portion including at least one of a pattern of characters, numbers, symbols, and logos; and
   a key body arranged in the insertion hole formed in the terminal body,
   wherein another surface of the second metallic layer is coupled to the key body to define an input key.

2. The portable terminal of claim 1, wherein the exposed portion is formed opposite a recess in another surface of the second metallic layer, the recess extending towards the through hole.

3. The portable terminal of claim 1, further comprising an oxidation coating layer or a plating layer provided on an exposed surface of the exposed portion.

4. The portable terminal of claim 1, wherein the exposed portion is a pressed portion.

5. The portable terminal of claim 1, wherein the first metallic layer or the second metallic layer includes a plurality of hook portions configured to be coupled to the terminal body.

6. The portable terminal of claim 1, wherein the exposed portion protrudes from the first metallic layer by a predetermined amount.

7. The portable terminal of claim 1, further comprising an optical source configured to provide light emission through a gap between a surface of the insertion hole and the cover.

8. The portable terminal of claim 5, further comprising an antenna mounted in the terminal body and configured to radiate a radio signal,
   wherein the cover is arranged so as to overlap the antenna, and
   wherein the second metallic layer is formed of stainless steel or aluminum.

9. The portable terminal of claim 1, wherein the first and second metallic layers are formed of at least one of titanium (Ti) and stainless steel (STS), and
   wherein the first and second metallic layers are coupled to each other by welding.

10. The portable terminal of claim 1, wherein the first and second metallic layers are formed of at least one of aluminum (Al), magnesium (Mg) and copper (Cu).

11. The portable terminal of claim 1, further comprising a camera mounted in the terminal body.

12. The portable terminal of claim 11, wherein the exposed portion includes a second through hole to receive the camera therein.

13. The portable terminal of claim 12, further comprising an anodized molding layer provided on a surface of the exposed portion,
 wherein the second metallic layer is formed of at least one of aluminum (Al), magnesium (Mg) and copper (Cu).

\* \* \* \* \*